United States Patent
Sasaki et al.

(10) Patent No.: US 12,182,233 B2
(45) Date of Patent: Dec. 31, 2024

(54) DELIVERY VEHICLE

(71) Applicant: TOYOTA JIDOSHA KABUSHIKI KAISHA, Toyota (JP)

(72) Inventors: Hidekazu Sasaki, Yokohama (JP); Daisuke Sato, Toyota (JP); Kazumi Serizawa, Toyota (JP); Shunsuke Mogi, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 254 days.

(21) Appl. No.: 17/861,456

(22) Filed: Jul. 11, 2022

(65) Prior Publication Data

US 2023/0020932 A1 Jan. 19, 2023

(30) Foreign Application Priority Data

Jul. 19, 2021 (JP) .................. 2021-118883

(51) Int. Cl.
*G06F 21/30* (2013.01)
*B60W 60/00* (2020.01)
*G06F 21/44* (2013.01)
*G06F 21/60* (2013.01)
*G06Q 10/0832* (2023.01)

(52) U.S. Cl.
CPC ..... *G06F 21/305* (2013.01); *B60W 60/00256* (2020.02); *G06F 21/44* (2013.01); *G06F 21/60* (2013.01); *G06Q 10/0832* (2013.01); *B60W 2556/40* (2020.02); *G06F 2221/2143* (2013.01)

(58) Field of Classification Search
CPC ........... B60W 2556/40; B60W 2556/50; G06F 21/305; G06F 21/44; G06F 21/60; G06Q 10/0832
See application file for complete search history.

(56) References Cited

U.S. PATENT DOCUMENTS

| | | | |
|---|---|---|---|
| 6,313,791 B1 * | 11/2001 | Klanke | B60R 25/1012 701/435 |
| 9,031,732 B1 * | 5/2015 | Cudak | G05D 1/021 701/23 |

(Continued)

FOREIGN PATENT DOCUMENTS

| | | | |
|---|---|---|---|
| EP | 3499192 B1 * | 10/2023 | ......... G01C 21/3673 |
| JP | 2021-033581 A | 3/2021 | |

(Continued)

*Primary Examiner* — Michael Simitoski
(74) *Attorney, Agent, or Firm* — Sughrue Mion, PLLC

(57) ABSTRACT

A delivery vehicle includes: a main body portion equipped with a moving mechanism; and a control section provided at the main body portion, wherein the control section includes: an autonomous driving executing section that controls the moving mechanism and makes it possible for the main body portion to travel autonomously; a destination information acquiring section that acquires information relating to a delivery destination or a collection destination of a package; a data transmitting section transmitting predetermined data for authentication to a management system that manages a secure area on a delivery path; and a data acquiring section that, in a case in which the data for authentication is authenticated by the management system, acquires area information including map information of the secure area from the management system.

3 Claims, 5 Drawing Sheets

(56) References Cited

U.S. PATENT DOCUMENTS

| | | | | |
|---|---|---|---|---|
| 9,534,905 | B1* | 1/2017 | Bostick | G06Q 10/083 |
| 9,828,092 | B1* | 11/2017 | Navot | G01C 21/20 |
| 2015/0006005 | A1* | 1/2015 | Yu | G06Q 10/08 |
| | | | | 701/22 |
| 2015/0120094 | A1* | 4/2015 | Kimchi | G01C 21/20 |
| | | | | 701/3 |
| 2015/0145643 | A1* | 5/2015 | Fadell | G07C 9/27 |
| | | | | 340/5.51 |
| 2017/0039510 | A1* | 2/2017 | Ogilvie | B66C 1/02 |
| 2017/0316699 | A1* | 11/2017 | Gil | B64F 1/0299 |
| 2017/0356747 | A1* | 12/2017 | Lagnemma | G01C 21/3461 |
| 2018/0020326 | A1* | 1/2018 | Gillen | G08G 1/005 |
| 2018/0060813 | A1* | 3/2018 | Ford | H04W 4/44 |
| 2018/0189516 | A1* | 7/2018 | Browning | G08G 5/0069 |
| 2018/0285653 | A1* | 10/2018 | Li | G08B 25/08 |
| 2018/0299274 | A1* | 10/2018 | Moghe | G01C 21/3896 |
| 2019/0027044 | A1* | 1/2019 | Laur | G07B 15/04 |
| 2019/0161190 | A1* | 5/2019 | Gil | E05F 15/77 |
| 2019/0306757 | A1* | 10/2019 | Husain | H04W 4/40 |
| 2020/0278215 | A1* | 9/2020 | Suzuki | G01S 19/45 |
| 2020/0398436 | A1* | 12/2020 | Cousins | B25J 5/007 |
| 2021/0018931 | A1* | 1/2021 | Knutson | H04W 4/40 |
| 2021/0114225 | A1* | 4/2021 | Fukunaga | G05D 1/0248 |
| 2021/0200225 | A1* | 7/2021 | Kaneichi | G01C 21/206 |
| 2021/0319529 | A1* | 10/2021 | High | G07C 9/00309 |
| 2021/0397188 | A1* | 12/2021 | Sato | G05D 1/0274 |
| 2022/0164662 | A1* | 5/2022 | Saki | H04W 4/027 |
| 2022/0262183 | A1* | 8/2022 | Oda | G07C 9/38 |

FOREIGN PATENT DOCUMENTS

| | | | |
|---|---|---|---|
| JP | 2021-64233 A | 4/2021 | |
| JP | 2021064233 A * | 4/2021 | B25J 11/008 |

* cited by examiner

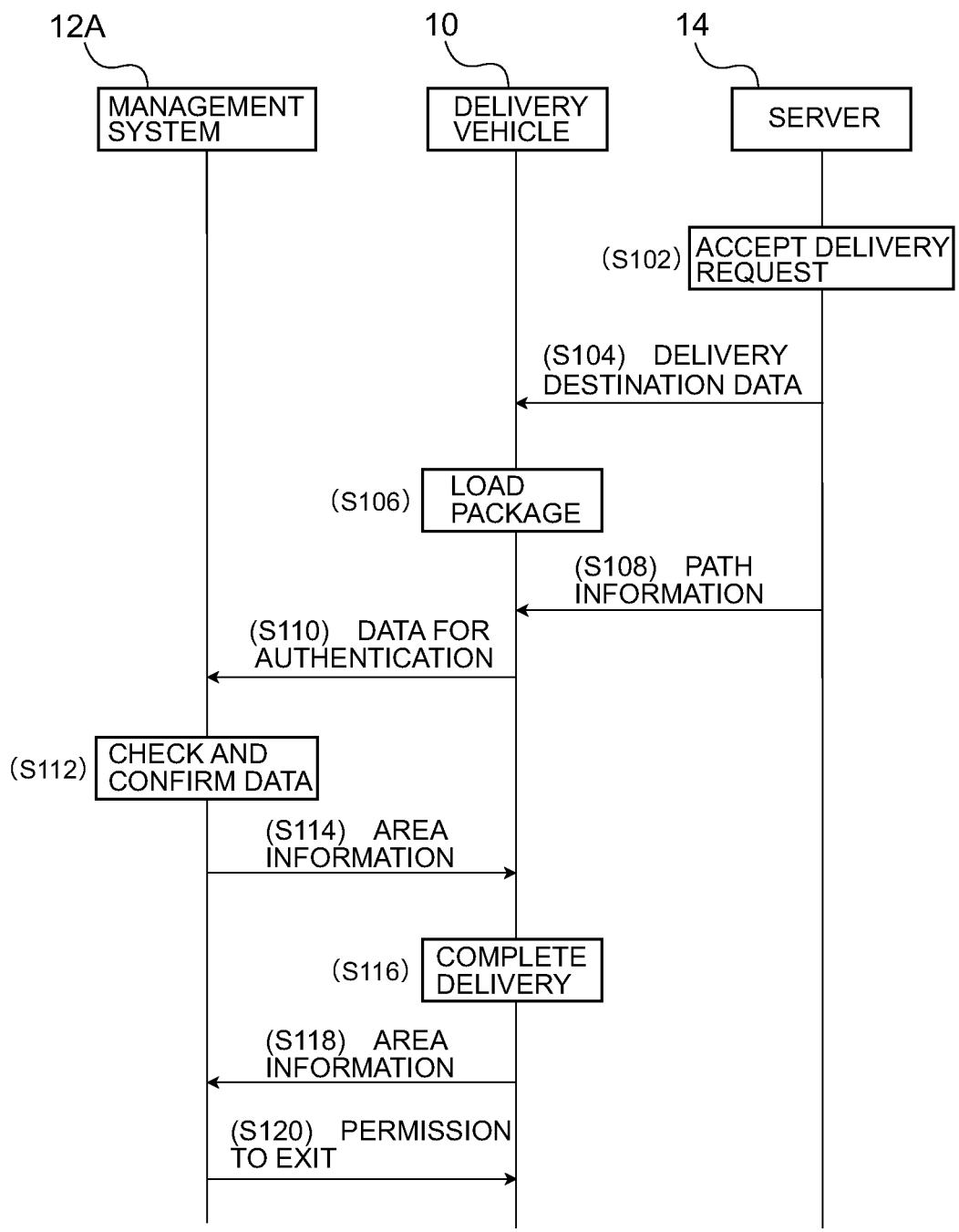

DELIVERY VEHICLE

CROSS-REFERENCE TO RELATED APPLICATION

This application is based on and claims priority under 35 USC 119 from Japanese Patent Application No. 2021-118883 filed on Jul. 19, 2021, the disclosure of which is incorporated by reference herein.

BACKGROUND

Technical Field

The present disclosure relates to a delivery vehicle.

Related Art

Japanese Patent Application Laid-Open (JP-A) No. 2021-33581 discloses a delivery system in which a home delivery robot delivers a package to a home. More specifically, when an instruction to deliver a package is received from a user terminal, the delivery system searches for a path to the delivery destination, and delivers to the home delivery robot on the basis of the path information that is searched.

However, in the delivery system described in JP-A No. 2021-33581, in a case in which there is a secure area of a building or the like on the delivery path, the package cannot be delivered unless there is a map of the secure area interior.

SUMMARY

The present disclosure provides a delivery vehicle that can deliver or collect a package even in a case in which there is a secure area on the delivery path.

A first aspect of present disclosure is a delivery vehicle including: a main body portion equipped with a moving mechanism; and a control section provided at the main body portion, wherein the control section includes: an autonomous driving executing section that controls the moving mechanism and makes it possible for the main body portion to travel autonomously; a destination information acquiring section that acquires information relating to a delivery destination or a collection destination of a package; a data transmitting section transmitting predetermined data for authentication to a management system that manages a secure area on a delivery path; and a data acquiring section that, in a case in which the data for authentication is authenticated by the management system, acquires area information including map information of the secure area from the management system.

The delivery vehicle of the first aspect includes the main body portion equipped with a moving mechanism, and the control section provided at the main body portion. Further, the control section includes the autonomous driving executing section, the destination information acquiring section, the data transmitting section and the data acquiring section. The autonomous driving executing section controls the moving mechanism and makes it possible for the main body portion to travel autonomously. Due thereto, the delivery vehicle can be made to travel autonomously, and can deliver or collect packages.

Further, the destination information acquiring section acquires information relating to a delivery destination or a collection destination of a package. The data transmitting section transmits predetermined data for authentication to a management system that manages a secure area on the delivery path. When the data for authentication is authenticated by the management system, the data acquiring section acquires area information, which includes map information of the secure area, from the management system. In this way, acquisition of area information is permitted for a delivery vehicle that has been authenticated by the management system, and therefore, travelling of the delivery vehicle within the secure area can be permitted while ensuring the safety of the secure area. Note that what is called a "secure area" herein is a concept that broadly encompasses areas whose map data is not widely disclosed such as private land or a housing complex, and areas in which unauthorized intrusion is prohibited by a security gate, and the like.

A second aspect of present disclosure, in the first aspect, may further include: a data deleting section that deletes the area information after delivery or after collection of the package.

In the delivery vehicle of the second aspect, the area information is deleted from the delivery vehicle by the data deleting section after delivery or after collection of a package. Due thereto, the safety of the secure area can be further improved. Note that what is called "deleting area information" herein is not limited to cases in which internal data of the delivery vehicle is deleted, and is a concept broadly encompassing cases in which internal data of the delivery vehicle disappears due to the area information being returned to the management system.

In a third aspect of the present disclosure, in the first aspect or the second aspect, the data for authentication that is may be transmitted by the data transmitting section is information relating to the delivery destination or the collection destination.

In the delivery vehicle of the third aspect, because the management system carries out authentication on the basis of information relating to the delivery destination or the collection destination, it can be made such that authentication is carried out only in cases in which it is confirmed that the delivery destination or the collection destination is within the secure area.

In a fourth aspect of the present disclosure, in any one of the first aspect to the third aspect, the data acquiring section may acquire, among the area information, only information that is needed for a path to the delivery destination or the collection destination.

In the delivery vehicle of the fourth aspect, because it suffices to not acquire information that is not needed for the path to the delivery destination or the collection destination, the safety of the secure area can be further improved.

The delivery vehicle relating to the present disclosure, a package can be delivered or collected even in a case in which there is a secure area on the delivery path.

BRIEF DESCRIPTION OF THE DRAWINGS

An exemplary embodiment of the present disclosure will be described in detail based on the following figures, wherein:

FIG. 5 is a sequence drawing illustrating an example of the flow of delivery processing relating to the exemplary embodiment.

DETAILED DESCRIPTION

Figure 1:
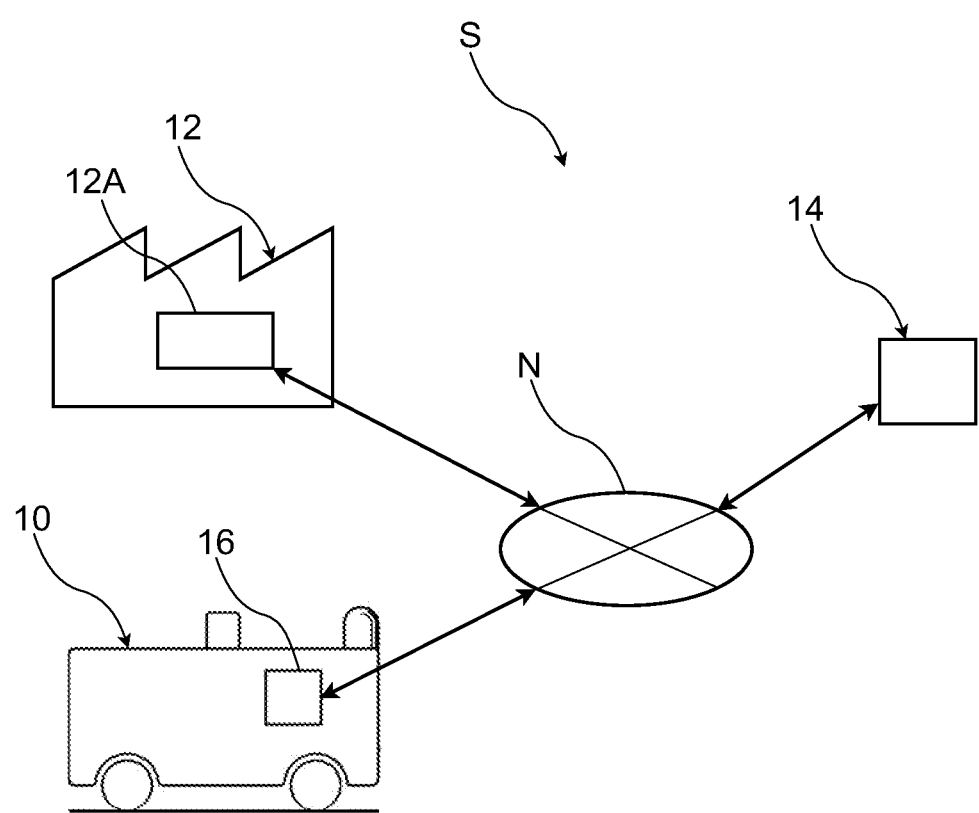
FIG. 1 is a schematic overall drawing of a delivery system that includes a delivery vehicle relating to an exemplary embodiment.

A delivery vehicle 10 relating to an exemplary embodiment of the present disclosure is described hereinafter with reference to the drawings. As illustrated in FIG. 1, a delivery system S that includes the delivery vehicle 10 of the present exemplary embodiment is structured to include the delivery vehicle 10, a server 14, and a factory 12 serving as a secure area.

The factory 12 is an example of the secure area, and a management system 12A of the factory 12 is connected to network N. Note that the secure area is not limited to the factory 12 provided that it is a secure area that is managed by a management system. For example, the secure area may be a housing complex or the like. Further, the secure area may be a construction site, a district, or the like that permits access to only involved parties.

A control section 16 of the delivery vehicle 10, the management system 12A of the factory, and the server 14 are structured so as to be able to communicate with one another via the network N. Further, the server 14 stores various information that are required for the delivery vehicle 10 to deliver or collect packages. For example, the server 14 stores information including information of persons requesting delivery, information relating to delivery destinations, information relating to paths to the delivery destinations, and the like.

Figure 2:
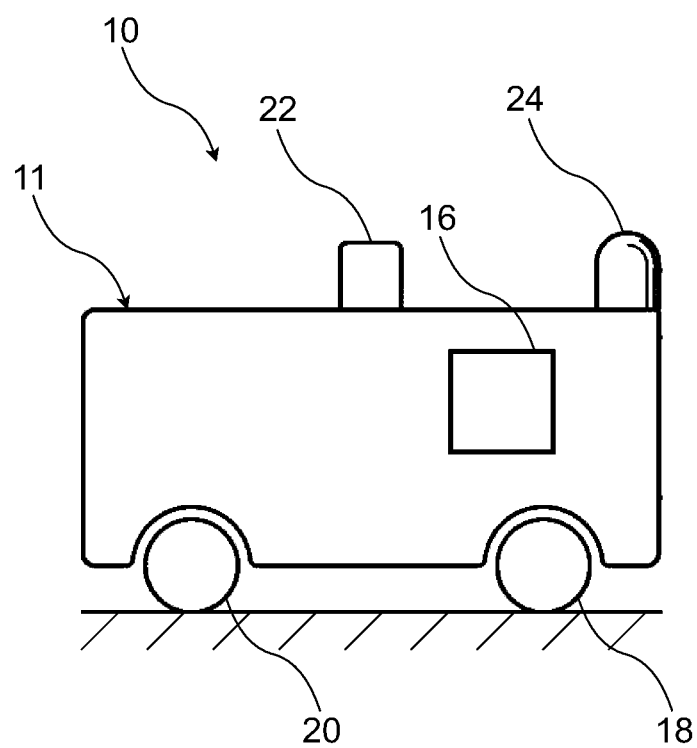
FIG. 2 is a schematic side view of the delivery vehicle relating to the exemplary embodiment.

As illustrated in FIG. 2, the delivery vehicle 10 is structured to include a main body portion 11 and the control section 16. As an example, the main body portion 11 is formed in a substantially rectangular shape as seen in a side view, and a cargo compartment that accommodates unillustrated packages is provided inside the main body portion 11.

The main body portion 11 includes a pair of left and right front wheels 18 and a pair of left and right rear wheels 20. Note that, in FIG. 2, only the front wheel 18 and the rear wheel 20 at the right side are illustrated. Here, unillustrated motors are provided at the front wheels 18 and the rear wheels 20, and the front wheels 18 and the rear wheels 20 are structured to rotate by the driving forces of the motors. Namely, the delivery vehicle 10 of the present exemplary embodiment is structured by in-wheel motors.

An unillustrated battery is provided inside the main body portion 11, and the front wheels 18 and the rear wheels 20 are independently driven respectively, due to electric power that is accumulated in this battery being supplied to the motors. Namely, the delivery vehicle 10 of the present exemplary embodiment is a type of BEV (Battery Electric Vehicle).

Moreover, a peripheral information detecting sensor 22 is provided at the upper portion of the main body portion 11. The peripheral information detecting sensor is a sensor for detecting obstacles and the like at the periphery of the delivery vehicle 10, and a combination of optical cameras, radar, LIDAR (Light Detection and Ranging) and the like are used therefor.

Further, a communication unit 24 is provided at the upper portion of the main body portion 11, further toward the front than the peripheral information detecting sensor 22. Communication with the exterior is carried out by this communication unit 24.

(Hardware Structures of Delivery Vehicle 10)

Figure 3:
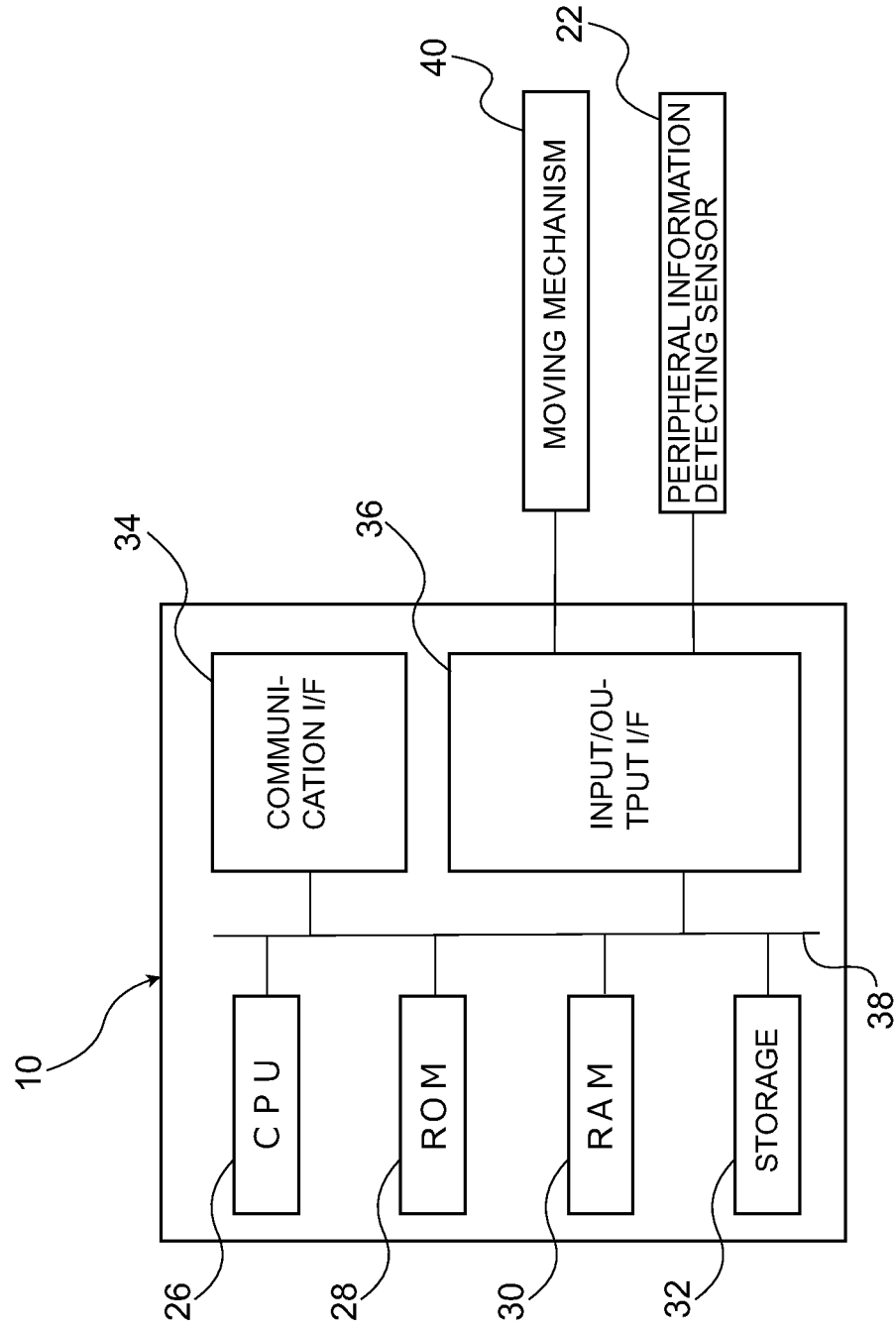
FIG. 3 is a block drawing illustrating hardware structures of the delivery vehicle relating to the exemplary embodiment.

FIG. 3 illustrates hardware structures of the delivery vehicle 10. The delivery vehicle 10 is structured to include a CPU (Central Processing Unit: processor) 26, a ROM (Read Only Memory) 28, a RAM (Random Access Memory) 30, a storage 32, a communication I/F (communication interface) 34 and an input/output I/F (input/output interface) 36. These respective structures are connected via an internal bus 38 so as to be able to communicate with one another.

The CPU 26 is a central computing processing unit that executes various programs and controls various sections. Namely, the CPU 26 reads-out a program from the ROM 28 or the storage 32, and executes the program by using the RAM 30 as a workspace. The CPU 26 controls the above-described respective structures and performs various computing processings in accordance with programs recorded in the ROM 28 or the storage 32.

The ROM 28 stores various programs and various data. The RAM 30 temporarily stores programs and data as a workspace. The storage 32 is structured by an HDD (Hard Disk Device) or an SSD (Solid State Drive) and stores various programs, including the operating system, and various data.

The communication IN 34 is an interface used by the delivery vehicle 10 to communicate with other equipment, and employs, for example, standards such as CAN (Controller Area Network), Ethernet®, LTE (Long Term Evolution), FDDI (Fiber Distributed Data Interface), Wi-Fi® or the like.

The input/output IN 36 is electrically connected to a moving mechanism 40 and the peripheral information detecting sensor 22.

The moving mechanism 40 is a mechanism for autonomously driving the delivery vehicle 10, and is structured to include the pair of front wheels 18, the pair of rear wheels 20, and the unillustrated motors that transmit driving force to the front wheels 18 and the rear wheels 20.

(Functional Structures of Delivery Vehicle 10)

The delivery vehicle 10 realizes various functions by using the above-described hardware resources. The functional structures realized by the delivery vehicle 10 are described with reference to FIG. 4.

Figure 4:
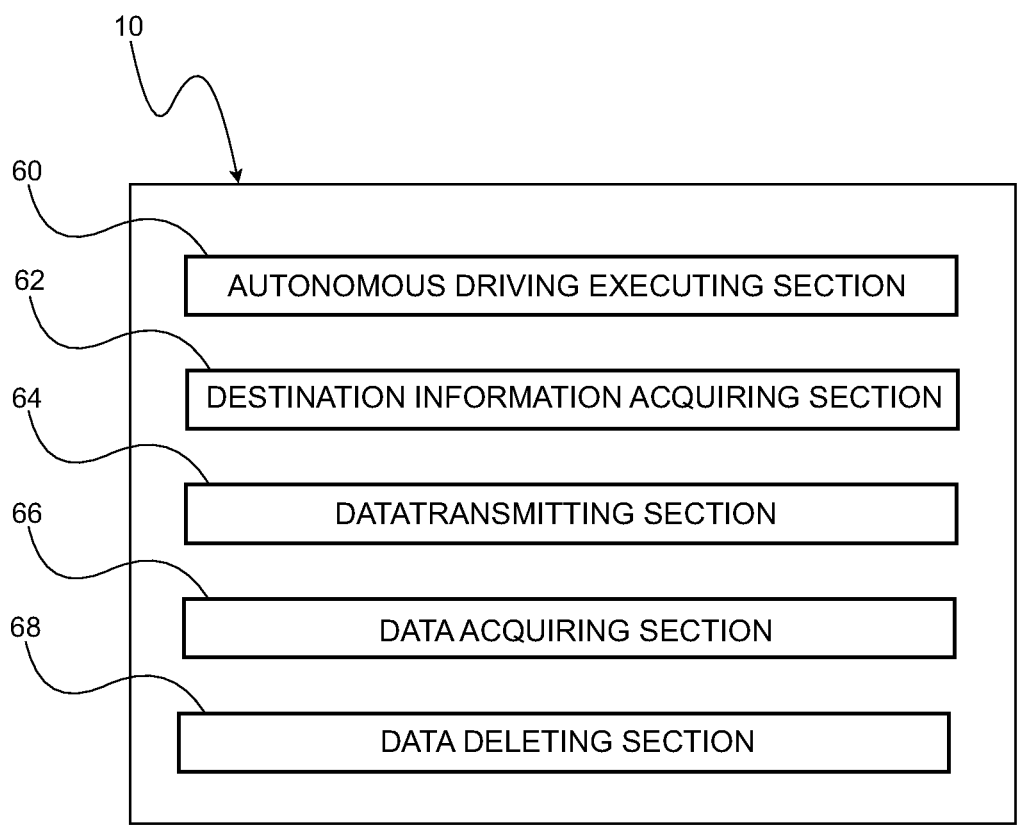
FIG. 4 is a block drawing illustrating functional structures of the delivery vehicle in the exemplary embodiment.

As illustrated in FIG. 4, the delivery vehicle 10 is structured to include, as the functional structures thereof, an autonomous driving executing section 60, a destination information acquiring section 62, a data transmitting section 64, a data acquiring section 66, and a data deleting section 68. Note that these respective functional structures are realized by the CPU 26 reading-out and executing a program stored in the ROM 28 or the storage 32.

The autonomous driving executing section 60 performs autonomous driving of the delivery vehicle 10. More specifically, the autonomous driving executing section 60 generates a travel plan on the basis of peripheral information detected by the peripheral information detecting sensor 22 and map information acquired from the server 14, and carries out autonomous driving by controlling the moving mechanism 40 so as to move the delivery vehicle 10 on the basis of the generated travel plan. Note that a highly precise map may be stored in advance in the storage 32 of the control section 16, and the travel plan may be generated on the basis of this highly precise map.

The destination information acquiring section 62 acquires information such as the address of the destination. More specifically, when the managing company or the like of the delivery vehicle 10 receives a request to deliver or collect a package, the managing company transmits a delivery or collection instruction to the delivery vehicle 10. At this time, information such as the address of the delivery destination or the collection destination, or the like, is transmitted from the system of the managing company to the delivery vehicle 10. The destination information acquiring section 62 acquires the information, such as the address of the delivery destination or the collection destination, or the like by receiving it from the managing company.

Note that, in a case in which information such as the address of the destination is stored in the server 14, the destination information acquiring section 62 may periodically access the server 14 and acquire information such as the address of the destination, and the like. Further, as an example, the destination of the delivery vehicle 10 of the present exemplary embodiment exists within a factory 12 that is a secure area.

The data transmitting section 64 transmits predetermined data for authentication to the management system that manages the secure area that is on the delivery path. Namely, in the present exemplary embodiment, the data transmitting section 64 transmits information relating to the delivery destination or the collection destination to the management system 12A of the factory 12. Here, the information that is transmitted from the delivery vehicle 10 to the management system 12A serves as data for authentication for authenticating the delivery vehicle 10.

At the time when the data for authentication is authenticated by the management system 12A, the data acquiring section 66 acquires area information, which includes map information of the interior of the factory 12, from the management system 12A. The area information includes, in addition to the map information, information relating to facilities such as elevators inside the factory 12, information relating to maintenance inspections, and the like.

As an example, in the present exemplary embodiment, the data acquiring section 66 is structured to acquire, of the area information, only the information that is needed for the path to the delivery destination or the collection destination. Therefore, map information and the like of other than the route are not acquired.

The data deleting section 68 deletes the area information after the package is delivered or collected. Namely, the delivery vehicle 10 arrives at the destination, completes the delivering or the collecting of the package, and returns to the entrance of the factory, and thereafter, the data deleting section 68 deletes the area information stored in the delivery vehicle 10.

Here, as an example, the present exemplary embodiment is structured such that, due to the area information being transmitted to the management system 12A, the area information is deleted from the delivery vehicle 10, and, after deletion of the data is confirmed by the management system 12A, exit from the factory 12 is permitted.

(Operation)

Operation of the present exemplary embodiment is described next.

(Delivery Processing)

FIG. 5 is a sequence drawing illustrating an example of the flow of delivery processing in the present exemplary embodiment. Here, the processings of the delivery vehicle 10, the server 14 and the management system 12A are described.

In step S102, an external request to deliver a package is accepted, and delivery destination data is transmitted to the server 14.

In step S104, the delivery vehicle 10 acquires the delivery destination data from the server 14 by the function of the destination information acquiring section 62.

In step S106, the delivery vehicle 10 loads the package that is the object of delivery into the cargo compartment.

In step S108, the delivery vehicle 10 acquires route information from the server 14. Note that the delivery vehicle 10 may acquire map information from the server 14, and calculate the route from the map information on the basis of the delivery destination data.

Step S110 is processing after the delivery vehicle 10 autonomously travels to the factory 12 that is a secure area. In step S110, the delivery vehicle 10 transmits data for authentication to the management system 12A. In the present exemplary embodiment, as an example, a portion of the delivery destination data acquired from the server 14 is the data for authentication.

In step S112, the management system 12A checks and confirms the data for authentication. For example, the management system 12A compares information of the delivery destination that is stored within the system and the received data for authentication. In a case in which the data for authentication matches the stored delivery destination information, the data for authentication is authenticated. Namely, the delivery vehicle 10 is permitted to travel within the factory 12.

In step S114, the delivery vehicle 10 acquires area information from the management system 12A by the function of the data acquiring section 66. Here, after the data for authentication is checked and confirmed, some area information is transmitted from the management system 12A to the delivery vehicle 10. More specifically, the management system 12A transmits only the area information that is needed for the delivery vehicle 10 to deliver the package.

In step S116, the delivery vehicle 10 autonomously travels on the basis of the area information, and completes the delivery. In a case in which an unloading mechanism is provided at the delivery vehicle 10 itself, the delivery is completed by the delivery vehicle 10 unloading the package. Moreover, in a case in which an unloading mechanism is not provided at the delivery vehicle 10 itself, after arriving at the destination, the package is picked-up by another machine or a person, thereby completing the delivery.

After returning to the entrance of the factory 12 on the basis of the area information, in step S118, the delivery vehicle 10 transmits the area information to the management system 12A by the function of the data deleting section 68. At this time, the area information is deleted from the delivery vehicle 10.

After the return of the area information has been confirmed by the management system 12A, in step S120, a signal for exit permission is transmitted from the management system 12A to the delivery vehicle 10. Due thereto, the delivery vehicle 10 can exit the factory 12.

As described above, in the delivery vehicle 10 of the present exemplary embodiment, as illustrated in FIG. 4, the autonomous travel executing section 60 controls the moving mechanism 40 so as to enable the main body portion 11 to travel autonomously. Due thereto, the delivery vehicle 10 can travel autonomously, and can deliver or collect packages.

Moreover, when the data for authentication is authenticated by the management system 12A, the data acquiring section 66 acquires area information, which includes map information of the secure area, from the management system 12A. In this way, the delivery vehicle 10 that has been authenticated by the management system is allowed to acquire area information. Therefore, travelling of the delivery vehicle 10 within the secure area can be permitted while ensuring the safety of the secure area.

Moreover, in the present exemplary embodiment, area information is deleted from the delivery vehicle by the data deleting section 68 after delivery or after collection of a package. Due thereto, the safety of the secure area can be further improved.

Moreover, in the present exemplary embodiment, the management system carries out data authentication on the basis of information relating to the delivery destination or the collection destination. Therefore, it can be made such that authentication is carried out only in cases in which it is confirmed that the delivery destination or the collection destination is within the secure area.

Further, in the present exemplary embodiment, the data acquiring section 66 acquires, among the area information, only the information that is needed for the path to the delivery destination or the collection destination. Therefore, because it suffices to not acquire information that is not necessary for the path to the delivery destination or the collection destination, the safety of the secure area can be further improved.

Although the delivery vehicle 10 relating to the exemplary embodiment has been described, various embodiments may of course be implemented within a scope that does not depart from the gist of the present disclosure. In the above-described exemplary embodiment, at the time of entering a secure area, the delivery vehicle 10 may enter into the secure area after confirming, on the basis of a signal from the peripheral information detecting sensor 22, that there are no other persons or vehicles at the periphery. Due thereto, a person or vehicle, which has not yet been authorized, entering into the secure area can be suppressed.

Further, the above exemplary embodiment is structured such that the data acquiring section 66 acquires, among the area information, only the information that is needed for the path to the delivery destination or the collection destination. However, the present disclosure is not limited to this. For example, the data acquiring section 66 may acquire all of the area information. Further, there may be a structure in which plural relay points are set on the path to the delivery destination or the collection destination, and the data acquiring section 66 acquires only area information up to the nearest relay point. In this case, the amount of data that is stored by the delivery vehicle 10 at one time can be reduced.

Further, there may be a structure in which, when area information up to the next relay point is acquired after the delivery vehicle 10 has reached the nearest relay point, the area information that is currently stored is deleted by the function of the data deleting section 68. In this case, the delivery vehicle 10 maintains only the area information from the reached relay point to the next relay point, and therefore, the safety of the secure area can be further improved, and deliveries can be carried out even by the delivery vehicle 10 that has a small storage space.

Moreover, in the above exemplary embodiment, some of the delivery destination data is data for authentication, but the present disclosure is not limited to this. For example, the delivery vehicle 10 may acquire data for authentication from the server 14, separately from the delivery destination data.

What is claimed is:

1. A delivery vehicle comprising a main body portion equipped with a moving mechanism, and a processor, wherein the processor is configured to:
   control the moving mechanism to allow the main body portion to travel autonomously;
   acquire information relating to a delivery destination or a collection destination of a package;
   transmit predetermined data for authentication to a management system that manages a secure area on a delivery path; and
   acquire area information including map information of the secure area from the management system after the predetermined data for authentication is authenticated, the map information of the secure area including information relating to facilities including elevators;
   delete the acquired map information of the secure area and transmit the deleted map information to the management system after delivery or collection of the package; and
   prohibit the delivery vehicle from leaving the delivery or collection destination until receiving confirmation that the secure area information has been received by the management system.

2. The delivery vehicle of claim 1, wherein the data for authentication is information relating to the delivery destination or the collection destination.

3. The delivery vehicle of claim 1, wherein the processor acquires, among the area information, only information that is needed for a path to the delivery destination or the collection destination.

* * * * *